United States Patent
Tanaka et al.

(10) Patent No.: US 7,910,888 B2
(45) Date of Patent: Mar. 22, 2011

(54) X-RAY ANALYZER

(75) Inventors: Keiichi Tanaka, Chiba (JP); Akikazu Odawara, Chiba (JP); Satoshi Nakayama, Chiba (JP); Sumio Iijima, Nagoya (JP); Shunji Bandow, Nisshin (JP)

(73) Assignee: SII NanoTechnology Inc., Chiba (JP)

( * ) Notice: Subject to any disclaimer, the term of this patent is extended or adjusted under 35 U.S.C. 154(b) by 154 days.

(21) Appl. No.: 12/343,364

(22) Filed: Dec. 23, 2008

(65) Prior Publication Data

US 2009/0184252 A1 Jul. 23, 2009

(30) Foreign Application Priority Data

Dec. 25, 2007 (JP) ................. 2007-331605
May 9, 2008 (JP) ................. 2008-124057

(51) Int. Cl.
*H01L 27/18* (2006.01)
(52) U.S. Cl. .................................. 250/336.2
(58) Field of Classification Search ............... 250/336.1, 250/336.2, 370.09; 378/43; 335/301
See application file for complete search history.

(56) References Cited

U.S. PATENT DOCUMENTS 5,258,573 A * 11/1993 Sugioka et al. ............... 505/211
6,230,499 B1 * 5/2001 Hohne .................................. 62/6

OTHER PUBLICATIONS

Reintsema et al., "Prototype system for superconducting quantum interference device multiplexing of large-format transition-edge sensor arrays," Oct. 2003, Review of Scientific Instruments, vol. 74, No. 10, pp. 4500-4508.*

Kudo et al., "Prototype of the multi-pixel x-ray microcalorimeter,", 2003, IEEE, The 12th International Conference on Solid State Sensors, Acutuators and Microsystems, pp. 1108-1111.*

Kamiya et al., "Geometry dependence of superconducting shielding for sensitive detectors," 2004, IEEE Transactions on applied superconductivity, vol. 14, No. 2, pp. 1042-1045.*

Kamitani et al., "Magnetic shielding effect of multiple-layer thin superconducting plates by T-method," 1997, IEEE Transactions on applied superconductivity, vol. 7, No. 2, pp. 2562-2565.*

Newbury et al., "The approaching revolution in X-ray microanalysis: The microcalorimeter energy dispersive spectrometer," 2000, Journal of Radioanalytical and Nuclear Chemistry, vol. 244, No. 3, pp. 627-635.*

K. D. Irwin, "An application of electrothermal feedback for high resolution cryogenic particle detection", Applied Physics Letters, 66, 1995, pp. 1998-2000.

K. Tanaka, et al., "A microcalorimeter EDS system suitable for low acceleration voltage analysis", Surface and Interface Analysis, 38, 2006, pp. 1646-1649.

* cited by examiner

*Primary Examiner* — David P Porta
*Assistant Examiner* — Kiho Kim
(74) *Attorney, Agent, or Firm* — Brinks Hofer Gilson & Lione

(57) ABSTRACT

Provided is an X-ray analyzer capable of significantly suppressing an influence of an external magnetic field on a transition edge sensor (TES). The X-ray analyzer includes: a TES (7) for detecting energy of a received X-ray as a temperature change and outputting the temperature change as a current signal; a superconducting magnetic shield (8) which contains the TES (7) and enters a superconducting state; and a room temperature magnetic shield (9) which covers the superconducting magnetic shield (8) and performs external magnetic field shielding until the superconducting magnetic shield (8) enters the superconducting state, in which the superconducting magnetic shield (8) and the room temperature magnetic shield (9) are concentrically arranged to have a cylindrical shape.

6 Claims, 4 Drawing Sheets

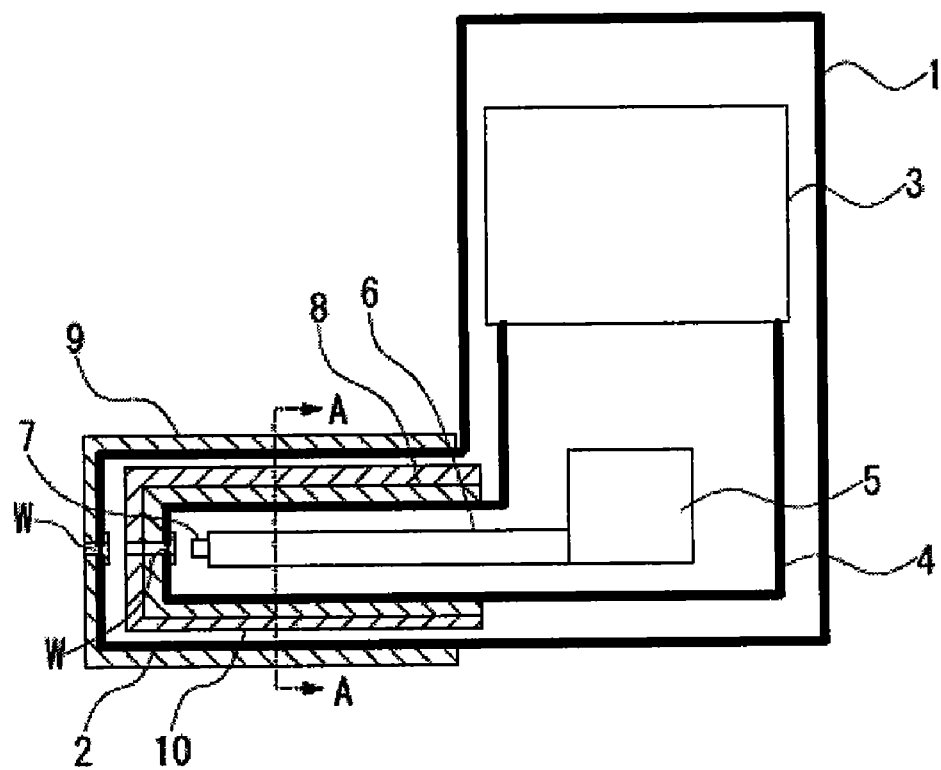
F I G. 1
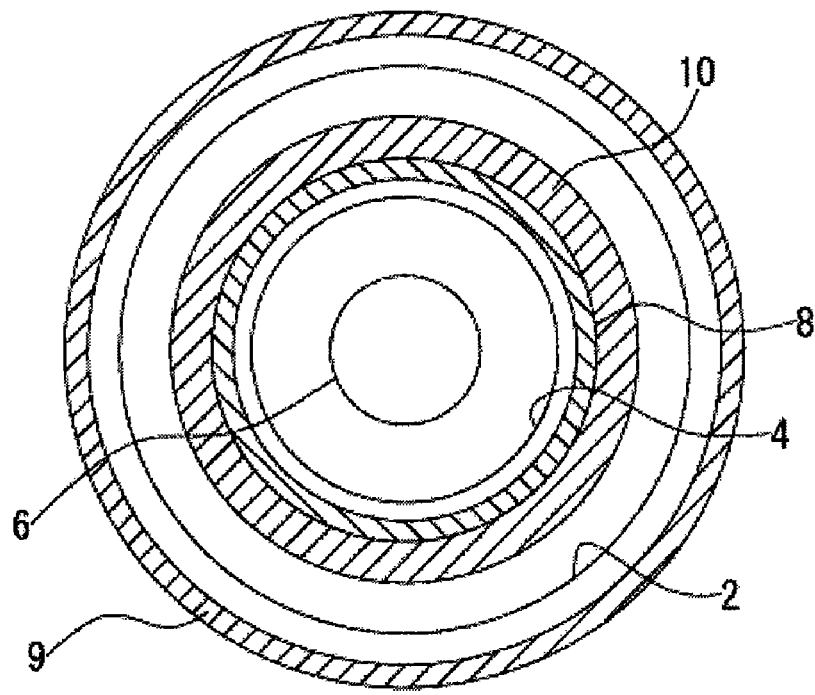
F I G. 2

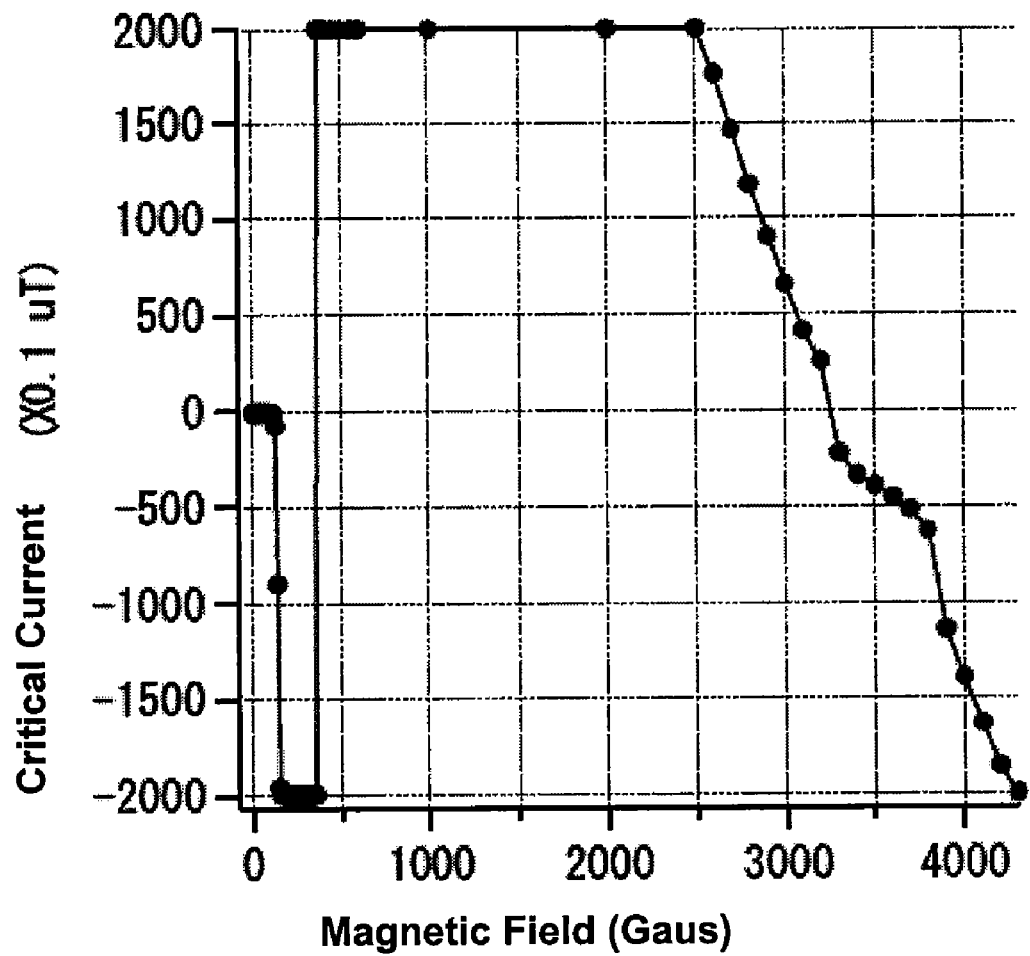
F I G . 3

X-RAY ANALYZER

RELATED APPLICATIONS

This application claims priority under 35 U.S.C. §119 to Japanese Patent Application Nos. JP2007-331605 filed on Dec. 25, 2007 and JP2008-124057 filed on May 9, 2008, the entire contents of which are hereby incorporated by reference.

BACKGROUND OF THE INVENTION

1. Field of the Invention

The present invention relates to an X-ray analyzer which is used for, for example, an electron microscope or a fluorescent X-ray analysis apparatus to perform energy discrimination of generated X-rays, thereby determining elemental species of a generation source, and more particularly, to an X-ray analyzer using, as an X-ray detector, a transition edge sensor for converting X-ray energy into thermal energy.

2. Description of the Related Art

As an X-ray analyzer capable of performing X-ray energy discrimination, there are known an energy dispersive spectroscopy (hereinafter referred to as EDS) and a wavelength dispersive spectroscopy (hereinafter referred to as WDS).

The EDS is an X-ray detector of a type that converts energy of an X-ray taken in the detector into an electrical signal in the detector and calculates the energy based on a magnitude of the electrical signal. The WDS is an X-ray detector of a type that produces a monochromatic X-ray from an X-ray by a spectroscope (energy discrimination) and detects the monochromatic X-ray by a proportional counter.

As the EDS, there is known a semiconductor detector such as a silicon lithium (SiLi) detector. When the semiconductor detector is used, energy in a wide range of approximately 0 keV to 20 keV can be detected. However, energy resolution is as narrow as approximately 130 eV, which is one tenth or less of the WDS.

In recent years, attention has been given to superconducting X-ray detectors which are of an energy dispersion type and equal in energy resolution to the WDS. Of the superconducting X-ray detectors, a detector called a transition edge sensor (hereinafter referred to as TES) is a high-sensitive thermometer based on a rapid change in resistance ($\Delta R$ to $0.1\Omega$ at $\Delta T$ to several mK) of a metal thin film at the time of superconduction-normal conduction transition. The TES is also called a microcalorimeter.

In the TES, a sample is irradiated with a radiation such as a primary X-ray or a primary electron beam from a radiation source. When a fluorescent X-ray or a characteristic X-ray which is generated from the sample is caused to enter the TES, temperature inside the TES changes. Therefore, the temperature is controlled to analyze the sample. Currently, an energy resolution equal to or smaller than 10 eV can be obtained as the energy resolution of the TES in a case of, for example, a characteristic X-ray of 5.9 keV (see K. D. Irwin, "An application of electrothermal feedback for high resolution cryogenic particle detection", Applied Physics Letters, 66, 1995, p. 1998).

When the TES is attached as an electron generation source to a thermal type (such as tungsten filament type) scanning electron microscope, a characteristic X-ray generated from a sample irradiated with an electron beam is obtained. As a result, it is revealed that characteristic X-rays (Si-Ka and W-Ma, b) which cannot be separated in a semiconductor X-ray detector can be easily separated by the TES (see K. Tanaka, et al., "A microcalorimeter EDS system suitable for low acceleration voltage analysis", Surface and Interface Analysis, 38, 2006, p. 1646).

The TES is provided in a tip end portion of a rod-shaped member called a cold finger which is attached to a cooling device to bring the detector close to the sample, as in the case of the conventional semiconductor EDS. In the case of the TES using the superconducting material, when a magnetic field equal to geomagnetism is applied as an external magnetic field to the sensor, sensitivity deteriorates because of the influence of the magnetic field. Therefore, a magnetic shield against geomagnetism is conventionally provided for a snout housing the cold finger.

The conventional technologies described above have the following problem.

For example, in the case of the TES described in K. Tanaka, et al., "A microcalorimeter EDS system suitable for low acceleration voltage analysis", Surface and Interface Analysis, 38, 2006, p. 1646, the thermal type (tungsten filament type) scanning electron microscope and the TES are separated from each other by several centimeters, and there is employed a structure in which a magnetic field is prevented from leaking from a barrel of the electron microscope. Therefore, the influence of the external magnetic field on the sensitivity of the TES is not observed. However, in a case of a high-resolution electron microscope (for example, field emission electron microscope), a fringing field is likely to influence the sensitivity of the TES. That is, in such an electron microscope, an in-lens type or semi-in-lens type objective lens in which the magnetic field is caused to leak outside the barrel is the mainstream, and a strong magnetic field is applied to converge primary electrons emitted from a field emission cathode, and thus the fringing field is likely to influence characteristics of the TES. It is highly conceivable that the TES will be used in a generated magnetic field equal to or larger than geomagnetism, in addition to the cases of the electron microscope and the fluorescent X-ray analysis apparatus. Thus, it is desired to stably operate the TES in a magnetic field equal to or stronger than geomagnetism.

SUMMARY OF THE INVENTION

The present invention has been made in view of the above-mentioned problem. An object of the present invention is to provide an X-ray analyzer capable of significantly suppressing an influence of an external magnetic field on a TES.

In order to solve the above-mentioned problem, the present invention employs the following structure. That is, an X-ray analyzer according to the present invention includes:

a transition edge sensor for detecting energy of a received X-ray as a temperature change and outputting the temperature change as a current signal;

a superconducting magnetic shield which contains the transition edge sensor and is made of a superconducting material;

a room temperature magnetic shield which covers the superconducting magnetic shield and performs external magnetic field shielding until the superconducting magnetic shield enters a superconducting state; and a cooling mechanism for cooling the transition edge sensor and the superconducting magnetic shield, in which the superconducting magnetic shield and the room temperature magnetic shield are concentrically arranged to have a cylindrical shape.

In the X-ray analyzer, the superconducting magnetic shield and the room temperature magnetic shield are concentrically arranged to have the cylindrical shape, and thus the superconducting magnetic shield and the room temperature magnetic shield each have an outer surface with a predetermined curvature. Therefore, the outer surface thereof does not have, for example, a corner portion in which a magnetic flux density of the external magnetic field increases, with the result that the external magnetic field can be prevented from reaching a critical magnetic field because of magnetic flux concentration. Thus, an excellent magnetic shield effect can be maintained, and hence the sensitivity of the TES can be stably obtained with high precision.

Further, the X-ray analyzer according the present invention is characterized in that the critical magnetic field of the superconducting magnetic shield is set to be equal to or larger than two times a maximum external magnetic field strength. As described later, when a magnetic field is perpendicularly applied from a side surface in the cylindrical superconducting magnetic shield, a magnetic flux density on the outer surface of the superconducting magnetic shield reaches up to two times the external magnetic field strength. Therefore, in the X-ray analyzer according to the present invention, the critical magnetic field of the superconducting magnetic shield is set to be equal to or larger than two times the maximum external magnetic field strength, and hence a magnetic field resistance required for a maximum magnetic flux density generated on the outer surface of the superconducting magnetic shield can be obtained.

Further, the X-ray analyzer according the present invention is characterized in that the superconducting magnetic shield includes a plurality of superconductor layers which are concentrically laminated. That is, in the X-ray analyzer, the superconducting magnetic shield includes the plurality of superconductor layers which are concentrically laminated to increase the number of superconductor surfaces and hence a flowing magnetic shield current. Thus, a significantly higher magnetic shield effect can be obtained compared with a case of including a single layer.

Further, the X-ray analyzer according the present invention is characterized by including a copper layer portion laminated on the superconducting magnetic shield. That is, the X-ray analyzer includes the copper layer portion laminated on the superconducting magnetic shield, and the copper layer portion having high thermal conductivity absorbs heat from the superconducting magnetic shield and transfers the heat to the outside. Thus, an excellent cooling state can be maintained.

Further, the X-ray analyzer according to the present invention includes a thermal conduction member, a tip end portion thereof being coupled to a base end portion of the superconducting magnetic shield, a base end portion thereof being connected with the cooling mechanism, in which the base end portion of the superconducting magnetic shield and the tip end portion of the thermal conduction member are formed into a step shape in cross section so as to be engageable with each other. That is, according to the X-ray analyzer, the base end portion of the superconducting magnetic shield and the tip end portion of the thermal conduction member are formed into the step shape in cross section so as to be engageable with each other to increase a contact area of the engaged portion, thereby realizing excellent thermal conduction.

Further, an X-ray analyzer according to the present invention further includes a high-thermal conduction auxiliary member which is made of one of aluminum and copper and straddles the base end portion of the superconducting magnetic shield and the tip end portion of the thermal conduction member so as to cover an outer surface of the base end portion and an outer surface of the tip end portion. That is, in the X-ray analyzer, the outer surface of the base end portion of the superconducting magnetic shield and the outer surface of the tip end portion of the thermal conduction member are covered with the high-thermal conduction auxiliary member which is made of one of aluminum and copper to achieve not only direct thermal conduction through an engaged portion between the superconducting magnetic shield and the thermal conduction member, but also high thermal conduction through the high-thermal conduction auxiliary member, thereby obtaining high thermal conductivity.

According to the present invention, the following effects are obtained.

That is, according to the X-ray analyzer of the present invention, the superconducting magnetic shield and the room temperature magnetic shield are concentrically arranged to have the cylindrical shape, whereby the external magnetic field can be prevented from reaching the critical magnetic field. Therefore, the excellent magnetic shield effect can be maintained, and hence the sensitivity of the TES can be stably obtained with high precision. In addition, the critical magnetic field of the superconducting magnetic shield is set to be equal to or larger than two times the maximum external magnetic field strength. Therefore, it is possible to obtain the superconducting magnetic shield having the magnetic shield effect corresponding to the maximum external magnetic field strength applied to the X-ray analyzer, and hence the TES serving as a superconducting X-ray detector can be reliably operated with high precision. As a result, the X-ray analyzer in which high energy resolution is maintained without fail can be provided.

BRIEF DESCRIPTION OF THE DRAWINGS

In the accompanying drawings:

FIG. 1 is a schematic longitudinal cross sectional view illustrating an X-ray analyzer according to an embodiment of the present invention;

FIG. 2 is a cross sectional view taken along an A-A line of FIG. 1;

FIG. 3 is a graph illustrating a residual magnetic field characteristic in a room temperature magnetic shield including a single layer in a case where a magnetic field is applied to the room temperature magnetic shield;

DETAILED DESCRIPTION OF THE PREFERRED EMBODIMENT

Figure 4:
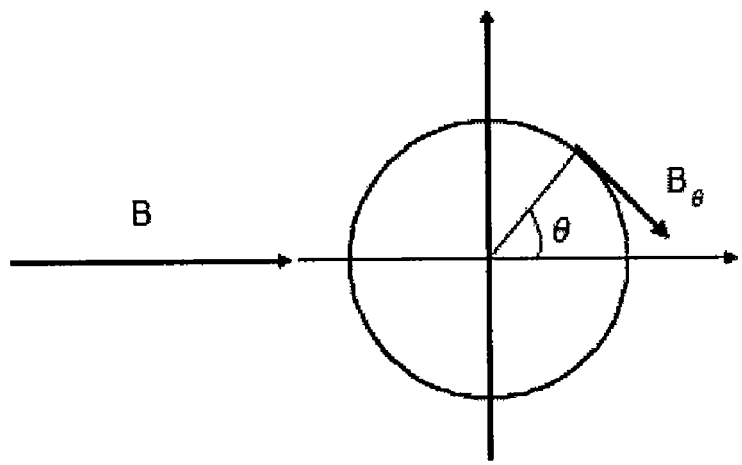
FIG. 4 is an explanatory diagram illustrating an inner magnetic field in a case where a magnetic field is perpendicularly applied from a side surface of a cylindrical superconducting magnetic shield.

Hereinafter, an X-ray analyzer according to an embodiment of the present invention is described with reference to FIGS. 1 to 6. In the respective drawings used for the following description, scales are changed as appropriate in order to illustrate respective members in recognizable or easy-to-recognize sizes.

The X-ray analyzer according to this embodiment is a device which can be used as a composition analyzer for, for example, an electron microscope, an ion microscope, an X-ray microscope, and a fluorescent X-ray analysis apparatus. As illustrated in FIG. 1, the X-ray analyzer includes a transition edge sensor (TES) 7 which is an X-ray detector for detecting energy of a received X-ray as a change in temperature and outputting the change in temperature as a current signal, a superconducting magnetic shield 8 which contains the TES 7 located therein and is made of a superconducting material, and a room temperature magnetic shield 9 which covers the superconducting magnetic shield 8 and performs external magnetic field shielding until the superconducting magnetic shield 8 enters a superconducting state.

To be specific, the X-ray analyzer includes a vacuum case 1 enveloping the entire X-ray analyzer, a vacuum tube 2 attached to the vacuum case 1 so as to protrude in the lateral direction, an auxiliary cooling mechanism 3 for cooling the vacuum case 1, a thermal shield plate (thermal conduction member) 4 having a tip end portion coupled to a base end portion of the superconducting magnetic shield 8 and a base end portion connected for cooling with the auxiliary cooling mechanism 3, a cooling device 5 which is surrounded by the thermal shield plate 4 and can perform cooling up to 300 mK or less, a cold finger 6 attached to the cooling device 5 in the lateral direction, the TES 7 attached to a tip end portion of the cold finger 6, the superconducting magnetic shield 8 which covers the TES 7 and is attached to a portion of the thermal shield plate 4, the room temperature magnetic shield 9 which covers the superconducting magnetic shield 8 and is provided on exterior of the vacuum tube 2, and a copper layer portion 10 laminated on the superconducting magnetic shield 8.

The room temperature magnetic shield 9 is provided to surround the superconducting magnetic shield 8 in a contact or non-contact state. In this embodiment, the room temperature magnetic shield 9 is located to surround the superconducting magnetic shield 8 in the non-contact state. The superconducting magnetic shield 8 and the room temperature magnetic shield 9 are concentrically arranged about the cold finger 6 as the center axis to have a cylindrical shape.

A critical magnetic field of the superconducting magnetic shield 8 is set to at least two times a maximum strength of the external magnetic field.

The superconducting magnetic shield 8 is formed by concentrically laminating a plurality of superconductor layers (not shown). In the superconducting magnetic shield 8 having the laminated structure, when the number of laminated superconductor layers is expressed by N and the maximum external magnetic field is expressed by B, a critical magnetic field of each of the superconductor layers is set to a value equal to or larger than 2B/N.

FIG. 2 is a cross sectional view illustrating the superconducting magnetic shield 8 of FIG. 1, which illustrates a state in which the copper layer portion 10 having high thermal conductivity is provided on the superconducting magnetic shield 8.

The vacuum case 1 and the vacuum tube 2 serve as a single vacuum chamber. The auxiliary cooling mechanism 3, the cooling device 5, and the cold finger 6 which are provided in the vacuum chamber are thermally insulated by vacuum necessary to eliminate thermal conduction from the thermal shield plate 4.

The auxiliary cooling mechanism 3 is used to cool the thermal shield plate 4 and to cool the cooling device 5 from room temperature to operatable temperature.

The cold finger 6 is a cylindrical rod-shaped member used to bring the TES 7 into as close contact as possible with an X-ray generation source. It is necessary to cool the TES 7 to the vicinity of temperature of the cooling device 5, and hence, for example, copper having high thermal conductivity is used as a material of the cold finger 6. The temperature of the superconducting magnetic shield 8 attached to the thermal shield plate 4 is desirably made equal to the temperature of the thermal shield plate 4. The attachment method is not limited to this. According to a desirable method, a copper paste is used between the thermal shield plate 4 and the superconducting magnetic shield 8 to metallically connect the thermal shield plate 4 and the superconducting magnetic shield 8 with each other. Several PET films such as Mylar (registered trademark) films are desirably provided outside the superconducting magnetic shield 8 in order to cut off thermal radiation from a high-temperature region.

The cooling device 5 includes a refrigerator capable of performing cooling up to the vicinity of 100 mK. For example, a dilution refrigerator or an adiabatic demagnetization refrigerator can be used. The dilution refrigerator is a refrigerator which performs cooling based on an enthalpy difference when 3 He is solved in 4 He while 3 He and 4 He are in a two-layer separation state in a mixing chamber. The adiabatic demagnetization refrigerator is a refrigerator which reduces a magnetic field applied to a magnetic salt to increase an entropy of the magnetic salt, thereby absorbing heat of an object to be cooled.

In each of the dilution refrigerator and the adiabatic demagnetization refrigerator, temperature equal to or smaller than 100 in K can be obtained. Temperature of the tip end portion of the cold finger 6 is determined based on the amount of heat generated in the TES 7, the thermal conductivity of the cold finger 6, and thermal radiation from the thermal shield plate 4. Assume that a material of the cold finger 6 is oxygen-free copper, a material of the thermal shield plate 4 is oxygen-free copper, and ultimate temperature of the auxiliary cooling mechanism 3 is equal to or smaller than 5 K. When the temperature of the cooling device 5 is the vicinity of 100 mK, a difference between the temperature of the tip end portion of the cold finger 6 and the temperature of the cooling device 5 is approximately several tens of milliKelvins.

Therefore, the auxiliary cooling mechanism 3, the cooling device 5, and the cold finger 6 serve as a cooling mechanism for cooling the TES 7 and the superconducting magnetic shield 8.

Next, a cooling process of the X-ray analyzer is described.

The vacuum chamber including the vacuum case 1 and the vacuum tube 2 is evacuated, and then the thermal shield plate 4, the cooling device 5, and the cold finger 6 are cooled by the auxiliary cooling mechanism 3. The ultimate temperature of the auxiliary cooling mechanism 3 is changed according to a used cooling medium. For example, when the thermal shield plate 4, the cooling device 5, and the cold finger 6 are to be cooled to temperature equal to or smaller than 5 K, liquid helium or a mechanical refrigerator is used for the auxiliary cooling mechanism 3.

In the case of liquid helium, a helium tank corresponds to the auxiliary cooling mechanism 3. A Gifford-McMahon refrigerator (GM refrigerator) or a pulse tube refrigerator is used as the mechanical refrigerator. The auxiliary cooling mechanism 3 and the cooling device 5 are thermally loosely connected with each other. For example, a stainless pipe having low thermal conductivity and which is thin (<0.5 mm) can be used between the auxiliary cooling mechanism 3 and the cooling device 5.

As described above, when the material having low thermal conductivity is connected between the auxiliary cooling mechanism 3 and the cooling device 5, there occurs a problem that a period necessary to reduce the temperature of the cooling device 5 to temperature equal to or smaller than 5 K is longer than in a case of a high-thermal conductivity material. In order to solve such a problem, for example, a rod which is made of a high-thermal conductivity material and provided to be movable by several millimeters is desirably inserted between the auxiliary cooling mechanism 3 and the cooling device 5.

The cooling device 5 is cooled to temperature equal to or smaller than 5 K by the auxiliary cooling mechanism 3 through the rod made of the high-thermal conductivity material, and then the rod is separated from the cooling device 5 by several millimeters. Therefore, the auxiliary cooling mechanism 3 and the cooling device 5 can be thermally isolated. When liquid helium with reduced pressure is used for the auxiliary cooling mechanism 3, the thermal shield plate 4, the cooling device 5, and the cold finger 6 can be cooled to temperature equal to or smaller than 3 K.

The room temperature magnetic shield 9 provided on the exterior of the vacuum tube 2 is used to prevent the external magnetic field from being leaked to the inner portion of the vacuum tube 2 when the thermal shield plate 4, the cooling device 5, and the cold finger 6 are to be cooled by the auxiliary cooling mechanism 3. For example, an iron nickel alloy called a permalloy can be used as a material of the room temperature magnetic shield 9. FIG. 3 is a graph illustrating a result obtained by measuring a fringing field strength in the room temperature magnetic shield 9 in a case where a Hall element is provided in the room temperature magnetic shield 9 having the cylindrical shape and an external magnetic field strength is changed.

One of sides of the room temperature magnetic shield 9 is completely opened and the other of the sides thereof is closed. A hole of φ6 is provided at an opposed position to the TES 7. Similarly, a hole is provided for each of the vacuum case 1, the copper layer portion 10, and the superconducting magnetic shield 8 at an opposed position to the TES 7. The holes are used to introduce X-rays from the outside. A window member W made of a laminated body of an aluminum film and an organic film or beryllium is attached to each of the holes in a closed state.

In the graph of FIG. 3, the axis of abscissa indicates the external magnetic field and the axis of ordinate indicates the fringing field strength in the room temperature magnetic shield 9. As is apparent from the graph, when the external magnetic field becomes 100 gausses to 200 gausses (10 milliteslas to 20 milliteslas), the magnetic field leaks. It is also apparent that magnetic field shielding cannot be performed by a permalloy under an environment of a magnetic field equal to or larger than 10 milliteslas to 20 milliteslas. Another material of the room temperature magnetic shield is an electromagnetic steel sheet material. When the external magnetic field is equal to or larger than 100 milliteslas, the fringing field is generated in the room temperature magnetic shield 9.

In order to operate the TES 7 under an environment of a magnetic field equal to or larger than 100 milliteslas, not the room temperature magnetic shield 9 but the superconducting magnetic shield 8 is used. As described above, the room temperature magnetic shield 9 is used to perform external magnetic field shielding until the superconducting magnetic shield 8 enters the superconducting state. A magnetic field resistance of the room temperature magnetic shield 9 is approximately 10 milliteslas. Therefore, when the superconducting magnetic shield 8 is to be cooled, it is desirable to set the external magnetic field to a value equal to or smaller than 1 milliteslas.

It has been known that the cold finger 6 moves during cooling from room temperature to 70 K because of thermal contraction. Therefore, in order to prevent the cold finger 6 from being brought into contact with the thermal shield plate 4 even when the cold finger 6 moves in any direction, the thermal shield plate 4 desirably has a cylindrical shape. That is, the thermal shield plate 4 has the cylindrical shape, and hence the superconducting magnetic shield 8 also has the cylindrical shape.

Niobium, or niobium titanium, or magnesium diboride which has superconducting transition temperature higher than 5 K can be used as a superconducting material of the superconducting magnetic shield 8.

FIG. 4 illustrates a state in a case where a magnetic field is perpendicularly applied from a cylindrical side surface in the superconducting magnetic shield 8. In this case, an internal magnetic field in a θ direction of the cylinder (cylindrical coordinate system) in the superconducting magnetic shield 8 is expressed by the following expression.

$$B_\theta \approx -2H\frac{a-\lambda_L}{a}\sin(\theta)$$

In the expression described above, "a" indicates a radius of the cylinder and $\lambda_L$ indicates a magnetic field penetration depth. Assume that a thickness of the cylinder in the superconducting magnetic shield 8 is sufficiently larger than the magnetic field penetration depth. When use temperature of the superconducting magnetic shield 8 is sufficiently lower than a transition temperature of a used superconductor, the magnetic field penetration depth is the order of nanometers, and thus sufficiently larger than the thickness of the cylinder (order of several hundred micrometers).

When θ=90 degrees, the expression described above becomes $B_{max}$=−2H. Therefore, it is apparent that a magnetic field strength two times an applied magnetic field is applied to an end portion of the cylinder. Thus, when the critical magnetic field of the superconducting magnetic shield 8 is not equal to or larger than two times the external magnetic field, a magnetic field resistance cannot be obtained.

In order to ensure the magnetic field resistance of the superconducting magnetic shield 8, not a single superconductor layer but a multilayer film including a plurality of superconductor layers is effective. In the case of excess of a saturation magnetic field, the permalloy used for the room temperature magnetic shield 9 loses the magnetic field resistance, and hence an increase in cross sectional area for inducing a magnetic field is effective. However, the magnetic field is eliminated by a magnetic shield current flowing through a surface of a superconductor (magnetic field penetration depth), and hence it is important to increase the number of surfaces. That is, increasing the number of surfaces is increasing the total number of magnetic shields. When the superconducting magnetic shield 8 includes a laminated body having a plurality of superconductor layers, as described above, it is effective that the copper layer portion 10 having high thermal conductivity is laminated in the laminated body to cool the inner portion of the superconducting magnetic shield 8.

Figure 5:
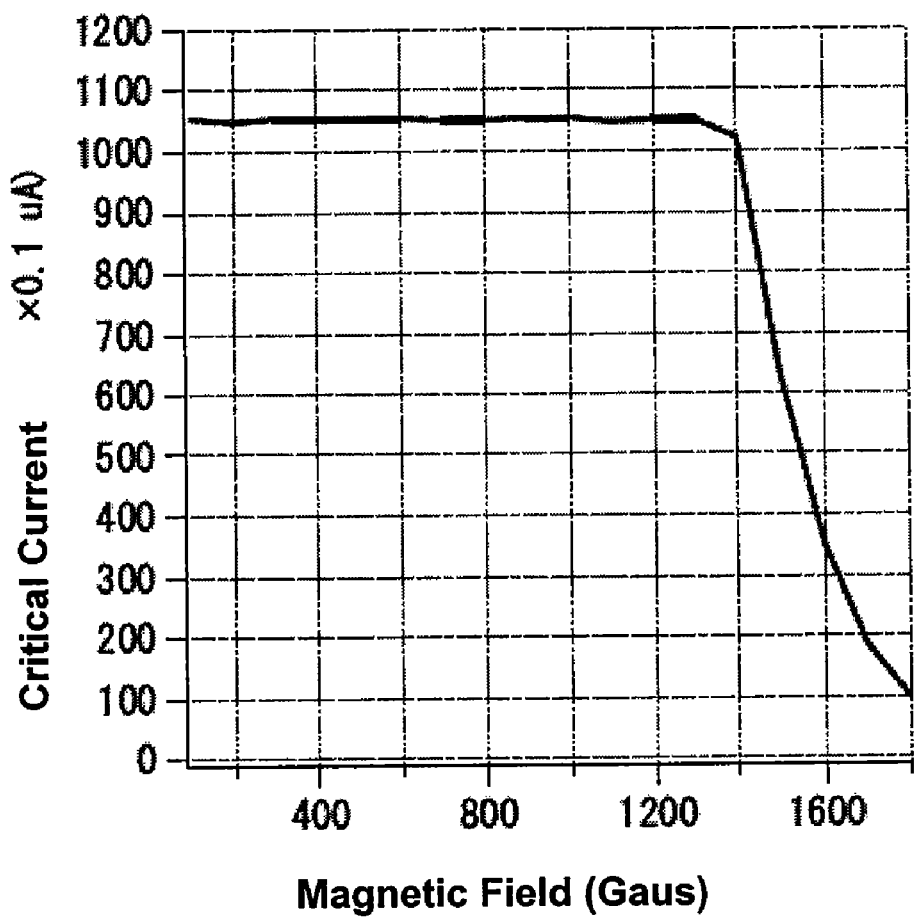
FIG. 5 is a graph illustrating a critical current characteristic on a magnetic field in a case where both a room temperature magnetic shield including a single layer and a superconducting magnetic shield are used and an X-ray detector (TES) made of a superconductor is provided in the superconducting magnetic shield.

FIG. 5 illustrates a relationship between a critical current of the TES 7 made of a superconductor and the external magnetic field in a case where the superconducting magnetic shield 8 in which 30 layers made of niobium titanium and copper are laminated is attached to the thermal shield plate 4.

The TES 7 includes: an absorber such as a metal band, a semimetal, or a superconductor, for absorbing X-rays; a thermometer made of a superconductor, for detecting heat generated in the absorber as a change in temperature; and a membrane for thermally loosely connecting between the thermometer and the cold finger 6 and controlling a flow rate of heat escaping to a heating bath. For example, aluminum can be employed for the absorber, a material including a titanium layer and a gold layer can be employed for the thermometer, and silicon can be employed for each of the membrane and the heating bath.

A shunt resistor (not shown) which is smaller in resistance than the TES 7 which is in the normal conduction state is connected in parallel to the TES 7. A superconducting quantum interference device amplifier (SQUID amplifier) (not shown) for reading a change in current which is generated in the TES 7 is connected in series with the TES 7.

When a bias current of 100 mA is applied to the TES 7 which is in the superconducting state, the entire bias current flows not into the shunt resistor but into the TES 7.

In this embodiment, the case where the current flowing through the TES 7 becomes equal to or smaller than 100 mA is defined as the state in which the TES 7 is influenced by the magnetic field. As a result, when 30 layers made of NbTi are used, a maximum value of an external magnetic field resistance is 130 mT. This value is not obtained in the case of a single permalloy. As is apparent from the result, for example, in order to provide a magnetic field resistance of approximately 500 mT, not the 30 layers but approximately 120 layers made of NbTi are desirably laminated.

As described above, in this embodiment, the room temperature magnetic shield 9 provided on the exterior of the vacuum tube 2 and the superconducting magnetic shield 8 provided inside the room temperature magnetic shield 9 are concentrically arranged to have the cylindrical shape, whereby the superconducting magnetic shield 8 and the room temperature magnetic shield 9 each have an outer surface with a predetermined curvature. Therefore, the outer surface thereof does not have, for example, a corner portion in which a magnetic flux density of the external magnetic field increases, with the result that the external magnetic field can be prevented from reaching the critical magnetic field because of magnetic flux concentration. Thus, an excellent magnetic shield effect can be maintained, and hence the sensitivity of the TES 7 can be stably obtained with high precision.

The critical magnetic field of the superconducting magnetic shield 8 is set to the value equal to or larger than two times the maximum strength of the external magnetic field. Therefore, the magnetic field resistance required for the maximum magnetic flux density generated on the outer surface of the superconducting magnetic shield 8 can be obtained.

As described above, according to the present invention, the room temperature magnetic shield 9 and the superconducting magnetic shield 8 are concentrically arranged, and the critical magnetic field of the superconducting magnetic shield 8 is equal to or larger than two times the maximum external magnetic field, and hence an X-ray analysis system can be reliably operated under the environment of the magnetic field equal to or larger than 100 mT.

The superconducting magnetic shield 8 includes the plurality of superconductor layers which are concentrically laminated, whereby the number of superconductor surfaces is increased to increase the flowing magnetic shield current. Therefore, a significantly higher magnetic shield effect can be obtained compared with the case of the single layer.

The copper layer portion 10 is laminated on the superconducting magnetic shield 8, and thus the copper layer portion 10 having high thermal conductivity absorbs heat from the superconducting magnetic shield 8 and transfers heat to the outside. Therefore, an excellent cooling state can be maintained.

Figure 6:
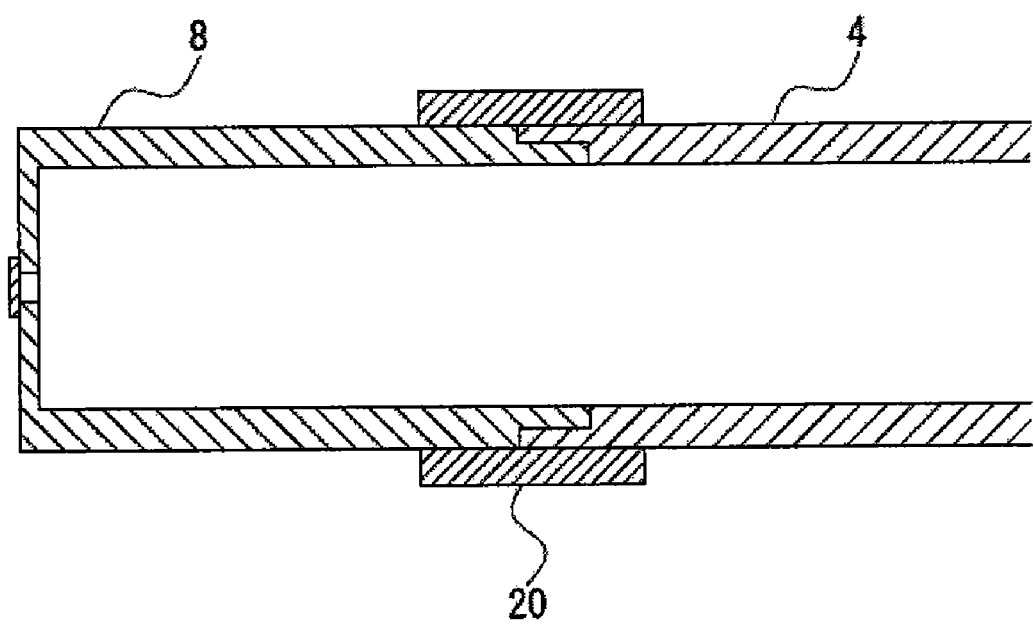
FIG. 6 is an enlarged cross sectional view illustrating an engaged portion between a thermal shield plate and a superconducting magnetic shield in another example of the X-ray analyzer according to the embodiment of the present invention.

Next, another example of the X-ray analyzer according to the embodiment of the present invention is described with reference to FIG. 6.

In the another example of the X-ray analyzer according to this embodiment, the base end portion of the superconducting magnetic shield 8 and the tip end portion of the thermal shield plate 4 are formed into a step shape in cross section so as to be engageable with each other.

According to the another example according to this embodiment, the base end portion of the superconducting magnetic shield 8 and the tip end portion of the thermal shield plate 4 are formed into the step shape in cross section so as to be engageable with each other, whereby a contact area of the engaged portion increases. Therefore, excellent thermal conduction can be realized.

The X-ray analyzer further includes a cylindrical high-thermal conduction auxiliary member 20 which is made of aluminum or copper and straddles on the base end portion of the superconducting magnetic shield 8 and the tip end portion of the thermal shield plate 4 to cover an outer surface of the base end portion and an outer surface of the tip end portion.

In this case, the outer surface of the base end portion of the superconducting magnetic shield 8 and the outer surface of the tip end portion of the thermal shield plate 4 are covered with the high-thermal conduction auxiliary member 20 which is made of aluminum or copper. Therefore, not only direct thermal conduction through the engaged portion between the superconducting magnetic shield 8 and the thermal shield plate 4, but also high thermal conduction through the high-thermal conduction auxiliary member 20 are performed, whereby high thermal conductivity can be obtained.

In a case where the high-thermal conduction auxiliary member 20 is not provided, when the superconducting magnetic shield 8 and the thermal shield plate 4 are of the engagement type and the thermal shield plate 4 and the superconducting magnetic shield 8 are equal to each other in level to have the same level surface, there is no step therebetween. In particular, when the vacuum tube 2 has a small diameter, the thickness of the thermal shield plate 4 is desirably minimized in order to prevent contact with the thermal shield plate 4 having different temperature. Under such requirement, the engagement type is effective.

It should be noted that the technical scope of the present invention is not limited to the embodiment described above, and thus various modifications can be made without departing from the spirit of the present invention.

For example, when a monitor mechanism is provided to prevent the superconducting magnetic shield, before transiting to the superconducting state, from entering a magnetic field higher than the critical magnetic field, a magnetic flux trap in the superconducting magnetic shield can be reliably eliminated.

What is claimed is:
1. An X-ray analyzer, comprising:
 a transition edge sensor for detecting energy of a received X-ray as a temperature change and outputting the temperature change as a current signal;
 a superconducting magnetic shield which contains the transition edge sensor and is made of a superconducting material;
 a room temperature magnetic shield which covers the superconducting magnetic shield and performs external magnetic field shielding until the superconducting magnetic shield enters a superconducting state; and a cooling mechanism for cooling the transition edge sensor and the superconducting magnetic shield, wherein the superconducting magnetic shield and the room temperature magnetic shield are concentrically arranged to have a cylindrical shape, and the superconducting magnetic shield has a critical magnetic field set to be equal to or larger than two times as strong as a maximum external magnetic field strength.

2. An X-ray analyzer according to claim 1, wherein the superconducting magnetic shield includes a plurality of superconductor layers which are concentrically laminated.

3. An X-ray analyzer according to claim 1, further comprising a copper layer portion laminated on the superconducting magnetic shield.

4. An X-ray analyzer according to claim 1, further comprising a thermal conduction member, a tip end portion of which is coupled to a base end portion of the superconducting magnetic shield, and a base end portion of which is connected with the cooling mechanism, wherein the base end portion of the superconducting magnetic shield and the tip end portion of the thermal conduction member are formed in a stepped shape in cross-section so as to be engageable with each other.

5. An X-ray analyzer according to claim 4, further comprising a high-thermal conduction auxiliary member which is made of one of aluminum and copper and straddles the base end portion of the superconducting magnetic shield and the tip end portion of the thermal conduction member so as to cover an outer surface of the base end portion and an outer surface of the tip end portion.

6. An X-ray analyzer, comprising:

a transition edge sensor for detecting energy of a received X-ray as a temperature change and outputting the temperature change as a current signal;

a superconducting magnetic shield which contains the transition edge sensor and is made of a superconducting material;

a room temperature magnetic shield which covers the superconducting magnetic shield and performs external magnetic field shielding until the superconducting magnetic shield enters a superconducting state;

a cooling mechanism for cooling the transition edge sensor and the superconducting magnetic shield; and a thermal conduction member, a tip end portion of which is coupled to a base end portion of the superconducting magnetic shield and a base end portion of which is connected with the cooling mechanism, wherein the superconducting magnetic shield and the room temperature magnetic shield are concentrically arranged to have a cylindrical shape, and the base end portion of the superconducting magnetic shield and the tip end portion of the thermal conduction member are formed in a stepped shape in cross-section so as to be engageable with each other.

* * * * *